(No Model.)
J. J. McTIGHE.
METHOD OF OPERATING HOT AIR ENGINES.
No. 429,283. Patented June 3, 1890.
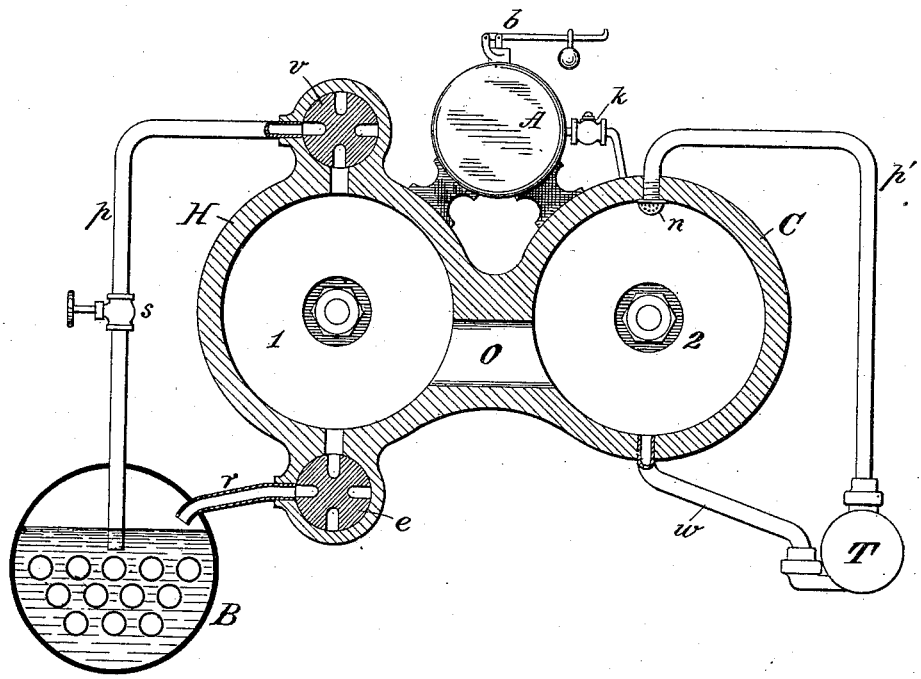
WITNESSES:
S. E. Field
Chas W. Price
INVENTOR:
James J. McTighe,
BY McTighe & Worthington
ATTORNEYS

UNITED STATES PATENT OFFICE.

JAMES J. McTIGHE, OF PITTSBURG, PENNSYLVANIA.

METHOD OF OPERATING HOT-AIR ENGINES.

SPECIFICATION forming part of Letters Patent No. 429,283, dated June 3, 1890.

Application filed December 4, 1889. Serial No. 332,573. (No model.)

*To all whom it may concern:*

Be it known that I, JAMES J. McTIGHE, a citizen of the United States, residing at Pittsburg, in the county of Allegheny and State of Pennsylvania, have invented certain new and useful Improvements in Methods of Operating Hot-Air Engines; and I do hereby declare the following to be a full, clear, and exact description of the invention, such as will enable others skilled in the art to which it appertains to make and use the same.

My invention relates to a novel method of transforming into motive power the store of heat which liquids, and particularly water, are capable of absorbing from flame or other sources. I have already, in a patent granted me dated September 24, 1889, No. 411,605, shown one method by which this same result may be obtained in a very efficient manner; and in my pending applications, Serial Nos. 318,435 and 329,858, I have described different apparatus for reducing said method to practice.

I propose to show herein a method which, while differing in many points from the above, will be simpler and more economical.

Generally my invention consists, first, in allowing water heated in one vessel to flash partly into steam in a piston-cylinder containing a working body of air under a pressure somewhat below that corresponding to the boiling-point of the water, the temperature of this body of air being so related to the temperature of the water that the amount of heat absorbed from the steam and water so reduces their temperature that saturation at the original high temperature of the water is no longer possible, and condensation takes place; secondly, in the method of withdrawing the unflashed water and water of condensation from the piston-cylinder as soon as it has completed its work of heating the air; thirdly, in the method of producing the finest spray possible for the most effective heating, and, finally, in the subsidiary steps adopted, all as hereinafter more fully described, and particularly pointed out in the claims.

I am aware that heretofore water at a high temperature has been flashed into steam in a chamber containing air under a pressure below the boiling-point of the water, said chamber communicating at intervals with a piston-cylinder. In such cases the water, after doing its work of heating the air, the heated air itself, and the flashed steam were all permitted to exhaust and go to waste. On account of the necessary great loss of latent heat such method was but little more economical than methods adopted in steam-engine practice.

By my method, as will be presently seen, I save the latent heat of the steam and, in addition, economize the power spent in compressing the air originally, not allowing any exhaust of steam or of the compressed air, excepting the unavoidable loss due to leakage.

In the accompanying diagram, which forms part of this specification, the figure is an explanatory diagram illustrating my invention graphically, the view being taken as a transverse section of the hot and cold cylinders near or at one end.

B is a heater, in which water is heated under the pressure of its own vapor to the desired temperature. A pipe $p$, having a stopcock or valve $s$, leads from below the surface of the water in B to a rotary valve $v$, which valve may be operated from the engine-shaft in any suitable manner. The rotary valve $v$, as shown, has one or more pockets, which in turn become filled with the hot water forced up through $p$ by the pressure of the vapor in the heater B. Any air that is in the pocket when it registers with $p$ will be compressed into a smaller space. When by the movement of valve $v$ a pocket containing the hot water registers with the opening into the cylinder, the hot water, owing to the pressure of its vapor and to the increased pressure of the air in the pocket, is ejected from the pocket and sprayed into said cylinder. Another valve $e$, of like construction and operation, is arranged below the cylinder and communicates with a return-pipe $r$, leading downward to the heater B. When a pocket in valve $e$ registers with the opening into the cylinder, it becomes filled with water. As it rotates it registers with the return-pipe $r$, and the water flows back to the heater B.

H and C are respectively the heating and cooling piston-cylinders, communicating by the passage O, which, as shown in my pending application, Serial No. 329,858, may be closed by a valve operated from the shaft, if desired, or the passage O may be wide open, as shown herein. A cold-water pump T, having the usual check-valves, with waste-pipe w, delivery-pipe p', and spraying-nozzle n, is arranged to force cold water into the cylinder C in the form of a stream or spray.

A is an air-tank supplied with air under pressure by a suitable air-pump, and provided with blow-off valve b and check-valve k, as shown in my pending application, Serial No. 329,858. Now suppose the air has been compressed first by the air-pump and then by the back-strokes of the pistons 1 and 2 until a pressure of two hundred pounds to the square inch is obtained. Let the air be all practically in cylinder H, and let there be one pound of it under said pressure and at a normal temperature of 60° Fahrenheit. Water at 382° Fahrenheit just boils under a pressure of two hundred pounds; but suppose the water in the heater is under the pressure of its own vapor brought to a temperature of 400° Fahrenheit. At this temperature it has a pressure of two hundred and fifty pounds to the square inch. The air in the pocket registering with pipe p has only a pressure of two hundred pounds; hence water will rise in pipe p, enter the pocket, and compress the air till equilibrium is established. Let the pocket be of such dimensions that when this equilibrium is established it will contain besides the air one pound of water at about 400° Fahrenheit. Now, as the valve v rotates so as to cause the pocket to register with H, the water, being of a higher pressure than the air in H, instantly flashes into steam and fine spray, being assisted by the compressed air in the pocket. The air into which the steam and water thus enter, being at a much lower temperature, obviously absorbs a considerable quantity of heat from them, and is thus heated instantaneously to about 350° Fahrenheit. Its pressure will thereby increase from two hundred pounds to three hundred and twenty pounds.

The transformations of energy and the sequence of their occurrence may be briefly stated as follows: The air normally is at 60° Fahrenheit and two hundred pounds initial pressure. Water heated to 400° Fahrenheit enters, boils, and flashes into steam. The mixed steam and unflashed water part with some heat—say 50°—their temperature thereby falling to 350° Fahrenheit. The air rises in temperature to the same point—i. e., from 60° to the resultant 350° Fahrenheit—and its pressure increases in a proportionate degree due to such increment of heat—i. e., the initial pressure of two hundred pounds becomes three hundred and twenty pounds. This increase of pressure in the body of air prevents the boiling-point of the water (which has lost 50° of heat) from following down with its loss of temperature, and the ebullition which took place at 400° Fahrenheit can no longer occur; hence the steam which was originally formed by the boiling of water at 400° Fahrenheit, having no longer such temperature and having a higher superincumbent resistance, can no longer exist as steam, and must return to the liquid condition—that is, condensation takes place, due partly to the fall in temperature of the water and steam and partly to the rise in pressure of the air. The exposed pocket in valve e fills at once with the unflashed water and water of condensation, both of 350° Fahrenheit, and by the rotation of valve e this is immediately returned to the heater. The pistons 1 and 2 now perform their outward stroke under the high pressure produced, and there is no steam, only air and vapor. On the return-stroke of the pistons 1 and 2 the air as piston 1 finishes its stroke is all in the cylinder C, where it is cooled as compressed by a spray of cold water, as shown in my said other applications and my Patent No. 401,605.

I have only described the operation in one end of the cylinder; but of course the same may be made to take place alternately in the other end. The highly-heated air in one end compresses the cool air in the other and beside does effective external work by turning the shaft. One special result that distinguishes the invention herein described from those shown in my patent and pending applications is to be found in the fact that the engine can be made to start simply by opening the stop-cock s and turning the valve v by hand, no pump being needed to inject a hot spray. What distinguishes it from other aero-steam-engines is the saving of the loss of latent heat of steam.

For regulation of speed the stop-cock s may be governed as a throttle-valve in a steam-engine in any of the usual ways.

What I claim, and desire to secure by Letters Patent, is—

1. The method of heating a body of air, consisting in heating water above its atmospheric boiling-point, allowing it to flash in the form of steam into a confined body of air of lower pressure, but such that the heat imparted to the air will so increase its pressure and the heat abstracted from the steam so lower its temperature as to cause condensation to take place.

2. The method of heating a body of air, consisting in causing water heated above its atmospheric boiling-point to flash as steam or as steam and water into the confined body of air at such pressure of the latter that the increase of pressure imparted to the air and the heat abstracted from the steam will so lower its temperature as to cause condensation to take place, and then withdrawing the water of partial condensation from the air.

3. The method of heating a body of air, consisting in causing water heated above its atmospheric boiling-point to flash as steam or as steam and water into the confined body of air at such pressure of the latter that the increase of pressure imparted to the air and the heat abstracted from the steam will so lower its temperature as to cause condensation to take place, and then withdrawing the water of partial condensation from the air before the latter expands sufficiently to permit reflashing of such water.

4. The method of heating a body of air contained in a vessel or chamber, consisting in heating water above its atmospheric boiling-point, admitting it under pressure to a chamber containing air at lower pressure, and thereby compressing such air, and, finally, utilizing the compressed air to force the hot water into another chamber containing the body of air to be heated and at a lower pressure.

5. The method of operating a hot-air engine, consisting in heating water above its atmospheric boiling-point and allowing it to enter as steam or steam and spray into the working-cylinder containing a working body of air of lower pressure, but such that the heat imparted to the air will so increase its pressure and the heat abstracted from the steam so lower its pressure as to cause partial condensation to take place.

6. The method of operating a hot-air engine, consisting in heating water above its atmospheric boiling-point and allowing it to enter as steam or steam and spray into the working-cylinder containing a working body of air of lower pressure, but such that the heat imparted to the air will so increase its pressure and the heat abstracted from the steam so lower its temperature as to cause partial condensation to take place, and withdrawing the water formed by such condensation before the expansion of the air following the movement of the piston can lower the pressure sufficiently to permit reflashing of such water.

In testimony whereof I affix my signature in presence of two witnesses.

JAMES J. McTIGHE.

Witnesses:
A. V. D. WATTERSON,
GALEN C. HARTMAN.